US008888358B2

(12) United States Patent
Levingston

(10) Patent No.: US 8,888,358 B2
(45) Date of Patent: Nov. 18, 2014

(54) OSCILLATOR SPRING COMPOSITION AND METHOD FOR FABRICATING AN OSCILLATOR SPRING

(75) Inventor: Gideon Rory Levingston, Grasse (FR)

(73) Assignee: Carbontime Limited, Bristol (GB)

( * ) Notice: Subject to any disclaimer, the term of this patent is extended or adjusted under 35 U.S.C. 154(b) by 162 days.

(21) Appl. No.: 13/576,554

(22) PCT Filed: Feb. 4, 2011

(86) PCT No.: PCT/GB2011/000150
§ 371 (c)(1),
(2), (4) Date: Aug. 1, 2012

(87) PCT Pub. No.: WO2011/095780
PCT Pub. Date: Aug. 11, 2011

(65) Prior Publication Data
US 2012/0298452 A1    Nov. 29, 2012

(30) Foreign Application Priority Data

Feb. 5, 2010  (GB) .................................. 1001897.6

(51) Int. Cl.
| F16F 3/08 | (2006.01) |
| B21F 35/00 | (2006.01) |
| B44C 1/22 | (2006.01) |
| F03G 1/04 | (2006.01) |
| B29C 67/24 | (2006.01) |
| F16F 1/02 | (2006.01) |
| F16F 1/10 | (2006.01) |
| G04B 43/00 | (2006.01) |
| G04B 17/06 | (2006.01) |

(52) U.S. Cl.
CPC . *F16F 1/10* (2013.01); *F16F 1/021* (2013.01); *G04B 43/007* (2013.01); *G04B 17/066* (2013.01)
USPC .......................................... 368/175; 368/169

(58) Field of Classification Search
USPC ......................... 368/127, 140, 168–170, 175
See application file for complete search history.

(56) References Cited

U.S. PATENT DOCUMENTS

| 7,641,381 | B2* | 1/2010 | Levingston ................... 368/127 |
| 2002/0180130 | A1* | 12/2002 | Baur et al. ..................... 267/156 |
| 2005/0281137 | A1* | 12/2005 | Bourgeois et al. ........... 368/175 |
| 2007/0140065 | A1* | 6/2007 | Levingston ................... 368/127 |
| 2008/0008050 | A1* | 1/2008 | Bourgeois ..................... 368/127 |
| 2008/0037376 | A1* | 2/2008 | Lippuner et al. ............. 368/139 |
| 2009/0116343 | A1* | 5/2009 | Levingston ................... 368/140 |

(Continued)

FOREIGN PATENT DOCUMENTS

| GB | 2416408 A | 1/2006 |
| WO | WO2006/123095 A2 | 11/2006 |

*Primary Examiner* — Amy Cohen Johnson
*Assistant Examiner* — Matthew Powell
(74) *Attorney, Agent, or Firm* — Leason Ellis LLP

(57) ABSTRACT

An oscillator spring material comprising a mixture of a host material with an additive in proportions which permit the thermal evolution of the material's elastic modulus to be tuned, e.g. to correct or compensate for other thermal changes in an oscillator system. The additive comprises a crystalline material having an abnormal thermal evolution of elastic modulus. The host material has a normal thermal evolution of elastic modulus. The additive is mixed with the host material before the host material undergoes a phase transformation into its final form. The additive has a phase transformation temperature higher than the host material, so that additive remains in the same state while the host material phase transformation takes place.

14 Claims, 1 Drawing Sheet

(56) References Cited

U.S. PATENT DOCUMENTS

2009/0303842 A1* 12/2009 Gritti et al. .................. 368/140
2010/0034057 A1* 2/2010 Levingston ................. 368/175
2010/0214880 A1* 8/2010 Rappo et al. ................. 368/127
2010/0290320 A1* 11/2010 Gygax et al. ................ 368/177
2011/0069591 A1* 3/2011 Daout ......................... 368/175
2011/0310711 A1* 12/2011 Bifrare et al. ............... 368/177

* cited by examiner

OSCILLATOR SPRING COMPOSITION AND METHOD FOR FABRICATING AN OSCILLATOR SPRING

TECHNICAL FIELD

The invention relates to a material composition for controlling the thermal evolution of elastic modulus (Young's modulus) and spring stiffness of oscillator springs for precision instruments. In particular it relates to compositions for and methods of making non-magnetically sensitive springs for use in systems where thermal stability is critical to the correct functioning of the system.

BACKGROUND TO THE INVENTION

Up to the early twentieth century, knowledge of materials with limited coefficients of expansion was essentially limited to naturally occurring materials, elements or compounds. The advent of atomic science in the early twentieth century brought with it both an emergent understanding of materials at atomic scale and the need for measurement several magnitudes of precision greater than had previously been known. This in turn led to research for new materials, compounds or alloys, which exhibited limited thermal expansion for the purpose of building measuring instruments.

One newly discovered material was the ferro-nickel alloy eventually named Invar, which was the work of several physicists, culminating in the limited thermal expansion alloy work of Charles Édouard Guillaume. The isotropic FeNi alloy produced has a low thermal linear expansion rate. Its derivative alloys can exhibit an abnormal (i.e. positive) thermal evolution of elastic modulus; that is, an increase in elastic modulus with a rise in temperature. The drawback of these alloys in the modern world (especially their use in balance springs for precision instruments) is their sensitivity to magnetic fields and a change from abnormal (i.e. positive) thermal evolution of elastic modulus to normal (i.e. negative) thermal evolution of elastic modulus in the ambient temperature range.

As well as discovering that the inflection of the curve showing thermal evolution of elastic modulus (i.e. the transition between abnormal and normal behaviour) of the FeNi alloy occurs at lower than blood temperature, the present inventor has investigated and successfully applied the use of new and non-magnetically sensitive materials to address problems arising from use of the FeNi alloy in balance springs for mechanical oscillator systems (such as for a horological mechanism, e.g. mechanical watch).

In general, the formula for timekeeping changes (U) consequent upon a rise in temperature of 1° C. in a watch's mechanical oscillator system, where the thermal expansion coefficient of the balance wheel is represented by the term $\alpha_1$, the thermal expansion coefficient of the balance spring by $\alpha_2$, the elastic modulus Young's modulus) by the term E, and the change in E over the 1° C. temperature rise by $\delta E$, is:

$$U = \alpha_1 - \frac{3\alpha_2}{2} - \frac{\delta E}{2E}.$$

U can be made to tend to zero when suitable values of $\alpha_1$, $\alpha_2$ and E are selected by careful choice of appropriate materials. It can be expedient to derive the solution to this equation in the material of the balance spring if possible by focusing on the terms $\alpha_2$ and $$\frac{\delta E}{2E}.$$

In other words, if the dimensional changes and elastic modulus can be controlled and equated with a given (i.e. fixed or otherwise predetermined) balance wheel thermal expansion rate, the total number of industrial processes and parts required to produce the oscillator can be reduced.

In WO 2004/008259 the present inventor disclosed using the anisotropy of certain balance spring materials such that the length of the spring did not increase with a rise in temperature whilst the width and height of the spring did increase with the same temperature rise. Such balance springs were disclosed for use in mechanical oscillator systems for horological instruments, e.g. mechanical watches. The thermal evolution of the balance spring material disclosed in this application can allow a very close rate in watches to be obtained and maintained using non-magnetic materials.

Separately, EP 1 422 436 discloses a watch balance spring material having an abnormal thermal evolution of elastic modulus comprising an isotropic material having a normal thermal evolution of elastic modulus coated with a material having an abnormal thermal evolution of elastic modulus. However, although a change in the sign of the thermal evolution of elastic modulus has been found, consistent manufacturing tolerance has been difficult to achieve and the resultant stiffening of the material has required further compensatory measures.

SUMMARY OF THE INVENTION

The present invention takes into account the differing properties of materials and in particular non-magnetically sensitive materials in order to provide a further solution to the same problem, wherein the manufacturing is further simplified and rendered more reliable.

At its most general, the invention provides a material having a net composition that allows for control of the elastic modulus with respect to changes in temperature and dimensional changes within the material. In other words, the material itself, through suitable configuration of its composition, may be able to provide the necessary corrective effect for its component part (e.g. balance spring) in the time keeping equation above through the thermal evolution of its elastic modulus and the stiffness of the spring alone.

According to the invention, there may thus be provided an oscillator spring made from a material comprising a mixture of phase-transformed host material having a normal thermal evolution of elastic modulus and a non-phase-transformed additive having an abnormal thermal evolution of elastic modulus, wherein the proportion of additive in the mixture is selected to control the thermal evolution of the spring's elastic modulus in an ambient temperature range to provide thermal stability to the spring's oscillation. In one embodiment, the spring may be for use with a balance in a mechanical oscillator system, wherein the proportion of additive in the mixture is selected to control the thermal evolution of the spring's elastic modulus in an ambient temperature range such that $$\frac{3\alpha_2}{2} + \frac{\delta E}{2E}$$

is substantially equal to $\alpha_1$, wherein $\alpha_1$ is the thermal expansion coefficient of the balance, $\alpha_2$ is the thermal expansion coefficient of the spring, E is the elastic modulus of the spring, and $\delta E$ is the change in E over a 1° C. temperature rise within the ambient temperature range.

Herein, ambient temperature range may be from 5° C. to 40° C. The proportion of additive may be determined empirically, e.g. to compensate for thermal variations in other components in the oscillator system. Indeed, an advantage of the invention is the ability to "tune" the thermal behaviour as required. In practice, the proportion of additive may be no more than 33 mol %, preferably no more than 10 mol %, more preferably no more than 5 mol %.

In the mechanical oscillator system itself, the balance may be any suitable balance mass for regulating the oscillation of the spring. The balance mass by a monolithic piece of material. In one embodiment, the balance mass may be integrally formed with the spring, e.g. from a single block of the mixture material defined above. For example, the balance mass may be a thickened region retained at an end of the spring during a forming or cutting process.

Control of the thermal evolution of the spring material may be achieved more precisely if the additive is mixed with the host material at the stage of the creation of the material before it is formed into whatever shape it is destined to take. Here, mixing may mean incorporating (i.e. physically intermixing) the additive within the host material, rather than adding it via a deposition process after the host material has been formed. In another aspect, the invention may thus provide a method of making an oscillator spring, the method comprising: mixing a phase-transformable precursor material with an additive; forming the mixture into a shape for subsequent use; heating the mixture to a temperature that causes the precursor material to exhibit a phase transformation into a host material having a normal thermal evolution of elastic modulus while the additive remains in a non-phase-transformed state, wherein the additive is made from a material having an abnormal thermal evolution of elastic modulus, and wherein the proportion of additive in the mixture is selected to control the thermal evolution of the spring's elastic modulus in an ambient temperature range to provide thermal stability to the spring's oscillation.

The host material, which may resemble a matrix in which the additive is dispersed, or a body to which the additive is applied may comprise carbon material, e.g. derived from any polymeric, or pitch or polyacrylonitrile (PAN) precursors. The preparation of the matrix or bulk host material may involve a stage where the material (e.g. the precursor material mentioned above) may be of liquid form of such relative viscosity as to allow the introduction of other material or materials into the mixture and allowing for very precise controlling of the proportions and weights required to enable the resulting material to perform according to requirement.

It has been found that the transformation critical temperature in producing certain new materials allows for the corrective material (i.e. additive) to go unaltered in the transformation process where the critical temperature for the additive material is not exceeded but where the bulk (host) material undergoes a change of phase. This is particularly but not exclusively the case with certain carbon materials derived from precursors where the precursor material undergoes a thermal process in order to derive the final state material.

In one embodiment, a body of host material having a normal thermal evolution of elastic modulus was coated with an additive material having an abnormal thermal evolution of elastic modulus to modify or change the thermal evolution of the elastic modulus of the combined material in the ambient range. A possible drawback with this embodiment is that it may be difficult to achieve constancy in the deposition thickness of applied material. Furthermore, a significant increase in stiffness may arise as well as an instability in the adherence of the thin additive film to the host material particularly when in mechanical flexion mode and the thin additive film approaches its sigma zero threshold, the point at which its linear elasticity gives way to plastic deformation or fracture. Accordingly, an embodiment in which the additive is mixed within the host material may be preferred.

The inventor's previous applications and granted patents include the use of carbon materials and this application introduces the addition of a corrective additive in particular, but not exclusively to those carbon materials, preferably but not exclusively amorphous carbon, known also as vitreous carbon. It also includes the use of additives, which may enhance the characteristics of the matrix of composites.

The additive may have a crystalline structure that exhibits abnormal (i.e. positive) thermal evolution of its elastic modulus in the ambient range. Such an additive material may, for example, be silicon dioxide. The additive may be mixed with the host material in micro fibre, continuous fibre or amorphous or other form, wherein the phase change temperature from the precursor state to the final phase state of the host material (e.g. carbon) may be adjusted so as not to cause the silicon dioxide and carbon to form an entire silicon carbide compound, or other additive to form an unwanted and non-useful compound and by not exceeding this temperature threshold. For example, leaving the silicon dioxide crystalline mechanism intact within the carbon material so that it may continue to display abnormal elastic modulus variation with a change in temperature.

A further mechanical advantage is displayed by the microporosity of the amorphous carbon material between $10^{-9}$ and $10^{-11}$ m as the small percentage of additional material embedded in the carbon bulk material causes less stress at the interface between the materials as a result of the elastic microstructure of the carbon, but at the same time as it provides the corrective measures sought.

A further advantage of including the corrective material (additive) within the preparation of the host material, whether as a matrix or as the bulk material, and preferably but not exclusively before the host material arrives at its final phase structure, are that the resultant stresses due to the mixing of two materials is dispersed within the material and not concentrated on the bulk-to-deposition film interface. The prior to final state mixing preparation allows for larger volumes of materials to be accurately mixed and the dispersion within the final material to be isotropic.

The material of the present invention may be useful for the stable functioning of a watch hairspring for example or other spring or spring-like component wherein the elastic modulus change with respect to temperature change must be preferably negligible or tend to zero or be of abnormal evolution. For example, the invention may be useful for instruments of precision, including, for example, watches and chronometers, seismographs, accelerometers, microelectromechanical system (MEMS) devices, mechanical fuses and others wherein the correlation of elastic modulus and temperature must be negligible for the reliable precise performance of the instrument or device.

The form of the finished component may be derived at the viscous stage of the material processing once mixed. Alternatively it may be derived from the final bulk material preparation which is so configured as to provide a readily useable shape for the manufacturing process, this may be but is not exclusively, sheet or rod form, or a same shape part way to that of the finished product.

The final components may be cut out individually or plurally by mechanical or chemical methods, or photon emission or ablation, ion beam or reactive plasma etching techniques, or a combination of these. In particular the non-crystalline non-metallic but conductive and low resistance amorphous carbon material may be cut by DRIE (deep reactive ion etching) or similar method wherein a plurality of components may be cut at the same time.

BRIEF DESCRIPTION OF THE DRAWINGS

An embodiment of the invention is discussed below with reference to the accompanying drawings, in which.

DETAILED DESCRIPTION OF AN EMBODIMENT

In an embodiment of the invention described below, an oscillator spring is made from a piece of amorphous (i.e. vitreous) carbon mixed with (in this case coated with) crystalline silicon dioxide.

Silicon dioxide can be both amorphous (non-crystalline) or crystalline in structure. Both structures display an abnormal (i.e. positive) thermal evolution of elastic modulus to at least 1700 K.

The amorphous carbon used in the embodiment begins as a polymer precursor. Following forming of the polymer precursor to a desired shape, the silicon dioxide is applied. However, for polymer precursor of suitable viscosity, the silicon dioxide may be intermixed before the shape-forming step is performed. In this embodiment, the proportion of silicon dioxide additive to carbon is about 4.5 mol % in the final mixture.

After the precursor (i.e. pre-phase-transformed host material) and silicon dioxide (additive) have been mixed and formed into the required shape, the mixture is heated to cause the precursor to undergo a phase transformation from polymer precursor to pure glassy carbon phase. Typically, the phase transformation occurs at a temperature at or below 1250 K.

The phase transformation of the carbon does not affect the state or phase of the silicon dioxide additive (whether amorphous or crystalline), i.e. there is no change of chemistry or form. Accordingly, the abnormal thermal evolution of the elastic modulus remains intact upon heating and cooling both in the temperature range of the material's manufacture and thereafter in the desired temperature range of its activity.

Figure 1:
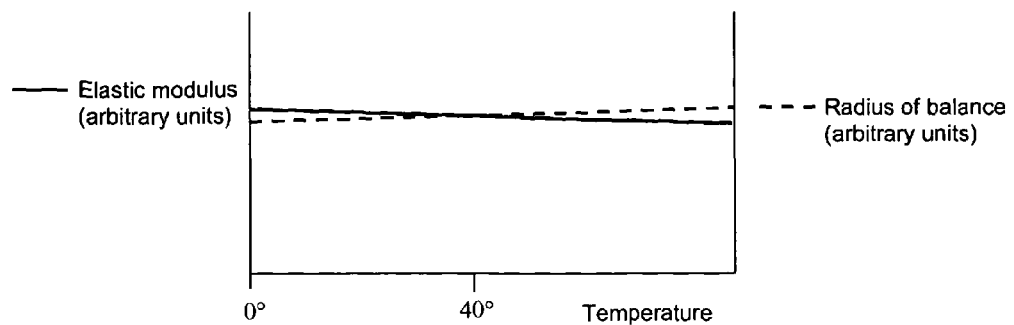
FIG. 1 is a schematic graph illustrating the thermal evolution of the elastic modulus of a plain piece of vitreous carbon.
Figure 2:
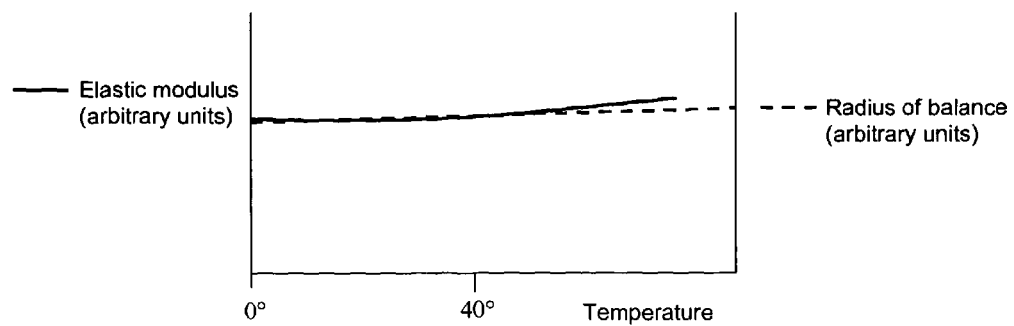
FIG. 2 is a schematic graph illustrating the thermal evolution of the elastic modulus of a piece of material comprising a mixture of vitreous carbon coated with a silicon dioxide.

The schematic graphs shown in FIGS. 1 and 2 illustrate the effect of the additive.

FIG. 1 shows the thermal evolution of elastic modulus of a plain vitreous carbon spring element. It is normal, i.e. has a negative gradient.

In contrast, FIG. 2 shows the thermal evolution of elastic modulus of a vitreous carbon spring element that is coated with silicon dioxide. The behaviour here is abnormal, i.e. has a positive gradient.

Both graphs also show a dotted line, which corresponds to the increase in radius of a typical balance wheel (e.g. comprising a block of quartz or other non-magnetically sensitive material) with temperature. The oscillator spring of the invention may be used in conjunction with such a balance wheel to form a mechanical oscillator system. In principle, if the thermal evolution of the elastic modulus of the spring can match (i.e. correlate with) the thermal evolution of the balance wheel radius, compensation for thermal effects can be achieved. Whilst FIG. 1 shows the thermal evolutions to be incompatible, FIG. 2 shows that it is possible to obtain a correlation in an ambient temperature range which permits thermal compensation to be performed.

The invention claimed is:

1. An oscillator spring made from a material comprising a mixture of phase-transformed host material having a normal thermal evolution of elastic modulus and a non-phase-transformed additive having an abnormal thermal evolution of elastic modulus, wherein the proportion of additive in the mixture is selected to be no more than 10 mol % to control the thermal evolution of the spring's elastic modulus in an ambient temperature range to provide thermal stability to the spring's oscillation, and the non-phase-transformed additive is physically intermixed within the phase-transformed host material.

2. An oscillator spring according to claim 1 for use with a balance in a mechanical oscillator system, wherein the proportion of additive in the mixture is selected to control the thermal evolution of the spring's elastic modulus in an, ambient temperature range such that $$\frac{3\alpha_2}{2} + \frac{\delta E}{2E}$$

is substantially equal to $\alpha_1$, wherein $\alpha_1$ is the thermal expansion coefficient of the balance, $\alpha_2$ is the thermal expansion coefficient of the spring, E is the elastic modulus of the spring, and $\delta E$ is the change in E over a 1° C. temperature rise within the ambient temperature range.

3. A mechanical oscillator system for a precision instrument, the system comprising:
 a balance mass; and
 an oscillator spring according to claim 2 arranged to oscillate the balance mass.

4. A mechanical oscillator system according to claim 3, wherein the balance mass is a monolithic piece of material.

5. A mechanical oscillator system according to claim 3, wherein the balance mass is integrally formed with the oscillator spring from a single piece of the material comprising a mixture of host material and additive.

6. An oscillator spring according to claim 1, wherein the additive comprises a crystalline material having a lower phase transformation temperature than the phase-transformed host material.

7. An oscillator spring according to claim 1, wherein the host material and additive are non-magnetically sensitive.

8. An oscillator spring according to claim 1, wherein the host material comprises vitreous carbon.

9. An oscillator spring according to claim 1, wherein the additive comprises silicon dioxide.

10. A method of making an oscillator spring, the method comprising:
 physically intermixing a phase-transformable precursor material with an additive;
 heating the mixture to a temperature that causes the precursor material to exhibit a phase transformation into a host material having a normal thermal evolution of elastic modulus while the additive remains in a non-phase-transformed state, wherein the additive is made from a material having an abnormal thermal evolution of elastic modulus, and wherein the proportion of additive in the mixture is selected to be no more than 10 mol % to control the thermal evolution of the spring's elastic modulus in an ambient temperature range to provide thermal stability to the spring's oscillation.

11. A method according to claim 10, wherein the spring is for use with a balance in a mechanical oscillator system, and wherein the method includes selecting the proportion of additive in the mixture to control the thermal evolution of the spring's elastic modulus in an ambient temperature range such that $$\frac{3\alpha_2}{2} + \frac{\delta E}{2E}$$

is substantially equal to $\alpha_1$ wherein $\alpha_1$ is the thermal expansion coefficient of the balance, $\alpha_2$ is the thermal expansion coefficient of the spring, E is the elastic modulus of the spring, and $\delta E$ is the change in E over a 1° C. temperature rise within the ambient temperature range.

12. A method according to claim 10 including, before final phase transformation of the precursor material, forming the mixture into a shape for subsequent use.

13. A method according to claim 10 including, after phase transformation of the precursor material, cutting one or more components from the mixture of host material and additive.

14. A method according to claim 13, wherein the cutting step comprises performing deep reactive ion etching (DRIE) to obtain a plurality of components from the mixture of host material and additive in one cutting operation.

* * * * *